Figure 1:
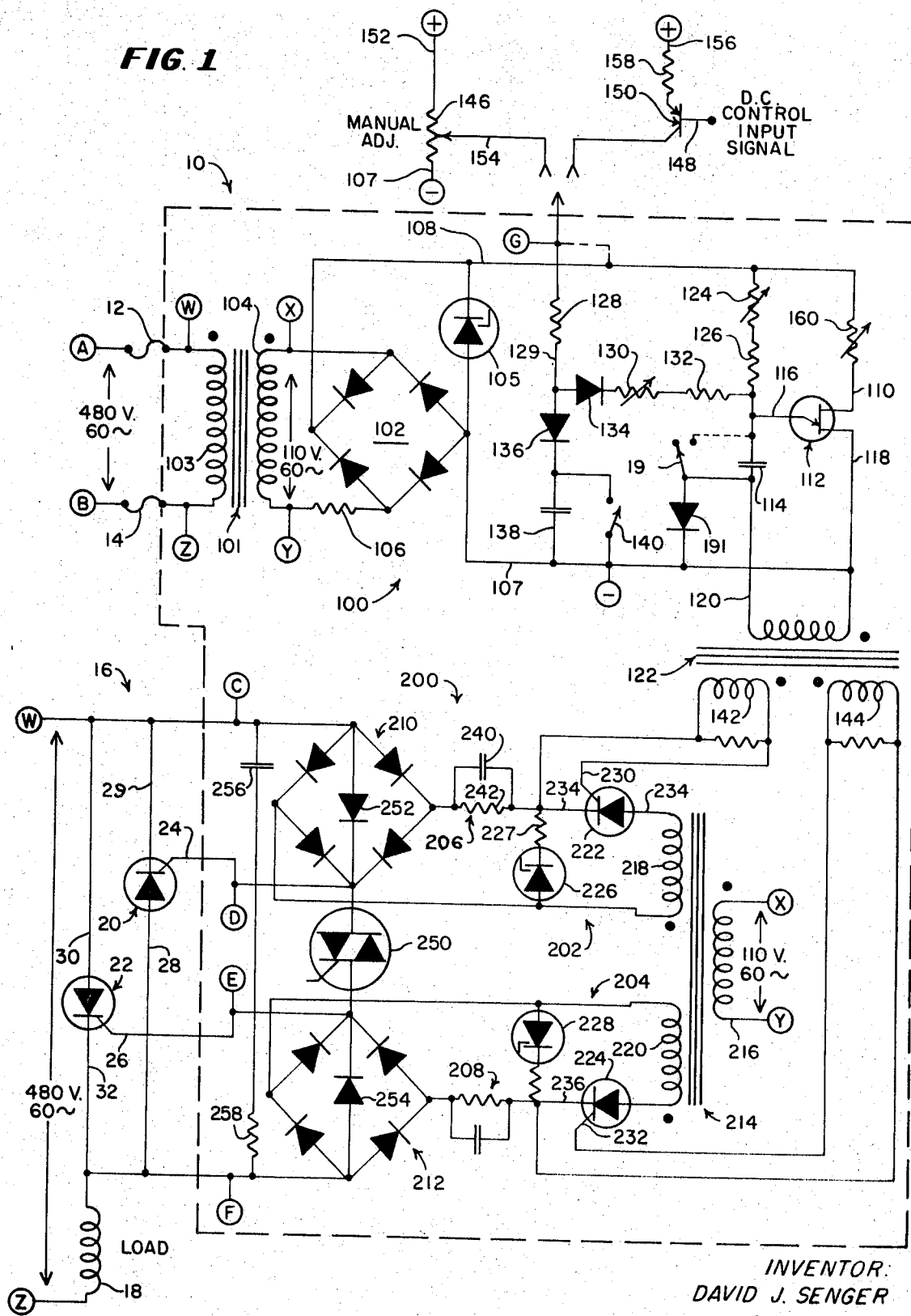

United States Patent

[11] 3,617,864

[72] Inventor David J. Senger
406 S. Hester, Stillwater, Okla. 74074
[21] Appl. No. 38,415
[22] Filed May 18, 1970
[45] Patented Nov. 2, 1971

[54] SOLID-STATE PHASE CONTROL PANEL
9 Claims, 3 Drawing Figs.
[52] U.S. Cl. .................................................. 323/22 SC,
323/24, 323/36, 317/50, 307/252
[51] Int. Cl. ......................................................... G05f 1/40,
H03k 17/00
[50] Field of Search ........................................... 323/22 SC,
36, 24; 318/341, 345, 227; 307/293, 301, 252;
317/31, 50, 33, 43; 321/45 S

[56] References Cited
UNITED STATES PATENTS
3,360,713 12/1967 Howell ........................ 323/22 SC
3,395,334 7/1968 Stein ........................... 323/22 SC
3,506,907 4/1970 Porterfield .................. 321/45 S
3,470,444 9/1969 Bixby .......................... 323/22 SC
3,366,861 1/1968 Dudler ........................ 318/227
3,244,964 4/1966 Greening ..................... 307/301 X Primary Examiner—J. D. Miller
Assistant Examiner—Harvey Fendelman
Attorney—Mason, Kolehmainen, Rathburn & Wyss ABSTRACT: An air-cooled phase control panel, including two controlled rectifiers, is designed to supply regulated amounts of power to a heavy industrial load such as a resistance welding unit. A trigger delay capacitor limits the power initially supplied to the load and protects the controlled rectifiers from starting transient currents. This trigger delay capacitor makes it possible to use high-speed overcurrent circuit breakers in series with the controlled rectifiers. A voltage breakdown device connected between the trigger terminals of the rectifiers protects the rectifiers from voltage transients. A trigger pulse amplifying and peaking circuit insures that the controlled rectifiers are rendered fully conductive in the minimum possible time and thus prevents any localized thermal destruction from occurring within the controlled rectifiers. Both single and multiple-phase embodiments are disclosed.

INVENTOR:
DAVID J. SENGER
BY Mason, Kolehmainen
Rathburn & Wyss
ATTORNEYS

SOLID-STATE PHASE CONTROL PANEL

The present invention relates to phase control panels, and more particularly to such panels designed to control the flow of power to heavy duty alternating current equipment.

In recent years, silicon controlled rectifiers and triacs have come into widespread use in alternating current control systems, particularly in such low power applications as lighting control and lightweight motor control. More recently, silicon controlled rectifiers have been introduced which have current capacities great enough to control the flow of power to heavy duty industrial equipment. The small size and low power dissipation of these semiconductor control devices would seem to make them ideal replacements for the cumbersome mercury ignitrons presently used for industrial power control. However, several undesirable properties of these devices greatly limit their usefulness.

Unlike thyratrons and ignitrons, semiconductor control devices cannot withstand temporary overloads for any length of time and therefore must be protected by fast blow circuit breakers or fuses. Fast blow circuit breakers and fuses are easily blown out by the starting current surges associated with most alternating current industrial equipment. As a result, the use of control rectifiers is generally limited to applications where no starting transients are encountered. Several circuits have been proposed for limiting the magnitude of starting transients, but these circuits greatly increase the complexity of the phase control panel. See, for example, U.S. Pat. Nos. 3,363,143, 3,376,487, and 3,500,174.

Two other problems limit the usefulness of controlled rectifiers. If the triggering pulses are weak, conduction within the rectifiers is momentarily limited to a small area directly adjacent the trigger contact of the semiconductor wafer. The heavy current flow through this small area can easily cause destruction of the rectifier. Voltage transients can also destroy controlled rectifiers. Incoming voltage surges which exceed the voltage rating of the controlled rectifiers can cause localized failures and excessively high temperatures within a semiconductor.

Accordingly, the primary objects of the present invention are to design a phase control panel which utilizes silicon controlled rectifiers to control the flow of power to heavy duty industrial equipment; which can supply power to inductive loads; which can supply any controlled amount of power from a very small amount to a very large amount; and which protects the controlled rectifiers from transient voltage surges, from current overloads, from trigger area overheating, and from starting transients.

In accordance with these and other objects, the present invention comprises briefly a phase control panel which includes a pair of forced air cooled controlled rectifiers. The rectifiers are triggered by a relaxation oscillator which generates pulses a predetermined time after the beginning of each power half cycle. A trigger delay capacitor is connected either directly across the relaxation oscillator or else directly across the source of charging current for the relaxation oscillator. When the flow of power first commences, this capacitor extends the predetermined time intervals, and thus reduces the flow of power through the controlled rectifiers. As the capacitor charges, the time intervals gradually become shorter, and the flow of power through the controlled rectifiers is gradually brought to its proper level. Starting transients are thus completely avoided. Fast blow circuit breakers or fuses are then used to protect the controlled rectifiers from excessive currents. A breakdown device connected between the trigger electrodes of the controlled rectifiers renders the rectifiers conductive before incoming voltage transients can exceed the breakdown voltage ratings of the rectifiers.

The controlled rectifiers are triggered through parallel RC peaking circuits by a second set of controlled rectifiers to which the trigger pulses are fed. This second set of controlled rectifiers supplies sufficient triggering power to the main controlled rectifiers to produce conduction throughout the controlled rectifiers before any severe, local heating can occur. The RC peaking circuits then quickly reduce the trigger currents to a low level so that the trigger contacts within the controlled rectifiers are not damaged.

Further objects and advantages of the present invention are to be found in the detailed description which follows, and the features of novelty which characterize the present invention are pointed out with particularity in the claims annexed to and forming a part of this specification.

Figure 2:
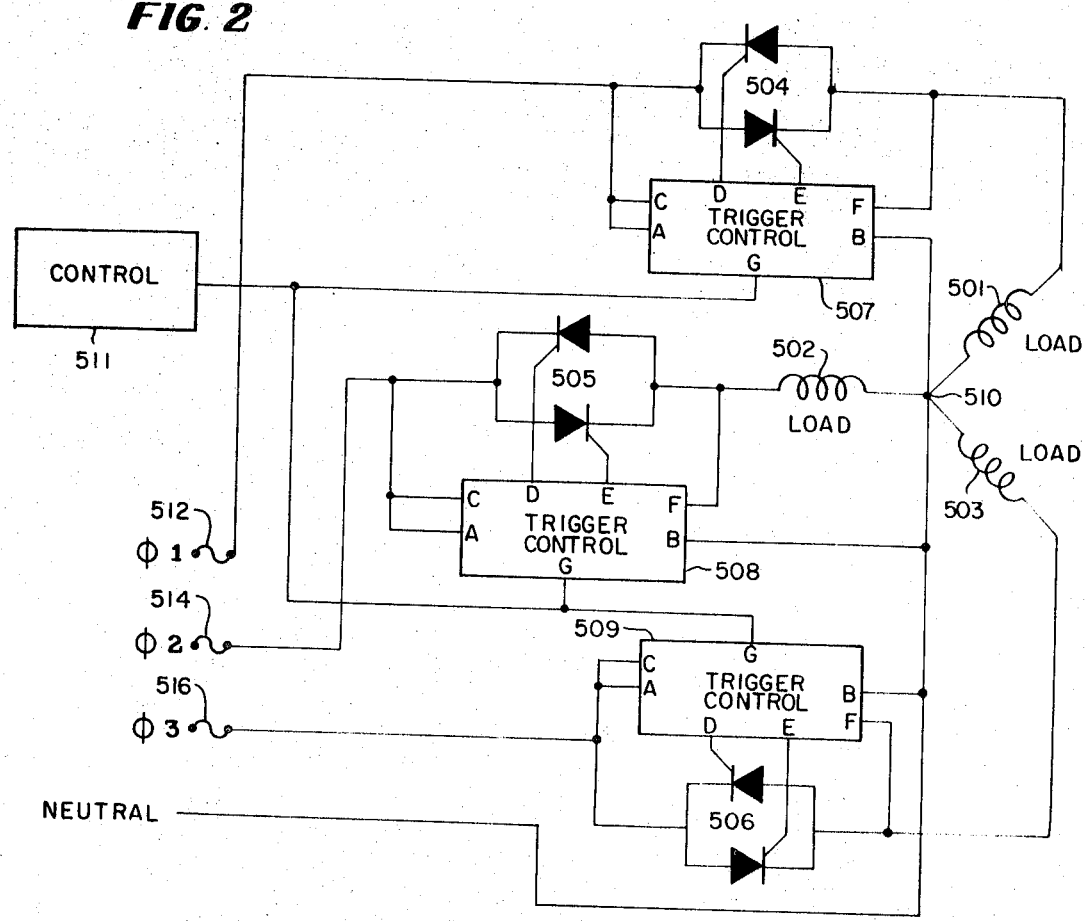
Figure 3:
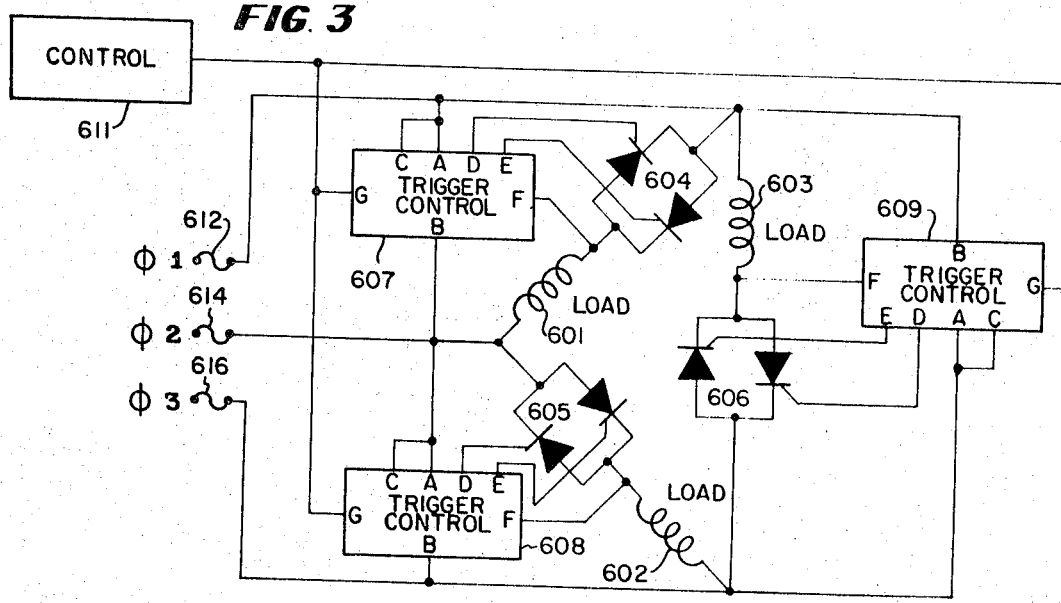

A better understanding of the present invention may be had by reference to the drawings wherein:

FIG. 1 is a schematic diagram of a phase control panel designed in accordance with the present invention and used to control the flow of power from a high power voltage source to a single phase, alternating current load;

FIG. 2 is a schematic showing how three of the phase control panels shown in FIG. 1 can be used together to control the flow of power from a Y-connected, three phase power source to a three phase, alternating current load; and FIG. 3 is a schematic diagram showing how three of the phase control panels shown in FIG. 1 can be used to control the flow of power from a three phase, delta connected power source to a three phase, alternating current load.

Referring now to the drawings, FIG. 1 shows a phase control panel designed in accordance with the present invention and indicated generally by the reference numeral 10. The phase control panel 10 accepts power from a 480-volt, 60-cycle power source (not shown) that is connected across the terminals labeled A and B. This power flows through fast blow fuses 12 and 14 and then flows through terminals W and Z to a series circuit 16 which includes a single phase alternating current load 18 and two silicon controlled rectifiers 20 and 22 which are connected together in parallel. The controlled rectifier 20 has its cathode 29 connected to the terminal W and its anode 28 connected to the load 18, while the controlled rectifier 22 has its anode 30 connected to the terminal W and its cathode 32 connected to the load 18. The panel 10 controls the time when triggering pulses are supplied to the gate electrodes 24 and 26 of the controlled rectifiers 20 and 22 and thereby controls the flow of power between the 480-volt power source (not shown) and the load 18.

The panel 10 includes a control subsection 100 and a trigger subsection 200. The control subsection 100 senses each fluctuation of the 480-volt power source and generates an output pulse a predetermined time interval after each fluctuation of the power source. This output pulse causes the trigger subsection 200 to initiate conduction in one or the other of the two controlled rectifiers 20 or 22 depending upon whether the terminal W is positive or negative with respect to the terminal Z at time when conduction is to be initiated. The trigger delay capacitor and the power level control are contained within the subsection 100.

The control subsection 100 contains a unijunction transistor timing circuit which comprises the unijunction transistor 112, the timing capacitor 114, the secondary winding 120, and two resistive charging paths 124–126 and 128–134–130–132 for the capacitor 114. The timing capacitor 114 is charged by current flow trough the two charging paths 124–126 and 128–134–30–132. When the potential across the timing capacitor 114 is high enough, the timing capacitor 114 is discharged through the secondary winding 120 by the unijunction transistor 112. The upper and lower bases 110 and 118 of the unijunction transistor 112 are connected respectively to the positive and negative nodes 107 and 108. The emitter 116 of the unijunction transistor 112 is connected to the positive node 108 by the two charging paths 124–126 and 128–134–130–132, and the emitter 116 is connected to the negative node 107 by a series circuit comprising the timing capacitor 114 and the secondary winding 120. A diode 191 is connected across the secondary winding 120 to suppress ringing, and a resistor 160 is connected in series with the base 110 to temperature-stabilize the the circuit and for other reasons discussed more fully below.

The unijunction transistor timing circuit is disabled momentarily at the end of each power supply half cycle and is thereby synchronized with the fluctuations of the power supply. A primary winding 103 of a power transformer 101 is connected across the 480-volt power supply at the terminals W and Z. A secondary 104 of the transformer 101 developes 110 volts of alternating current potential. The secondary 104 is connected to terminals X and Y and also to a full wave bridge rectifier 102 through a current limiting resistor 106. The rectifier 102 generates a continuous series of half sinusoids between a positive node 108 and a negative node 107. A Zener diode 105 is connected between the nodes 107 and 108 to clip off the tops of these half sinusoids. The node 108 is thus held at a fixed potential positive with respect to the node 107 at all times except when the power source voltage reverses its sign. Each time the power source voltage reverses its sign, the potential at the node 108 drops momentarily to 0 and causes the unijunction transistor 112 to discharge the timing capacitor 114. More specifically, current from the timing capacitor 114 flows through the emitter 116 and lower base 118 of the unijunction transistor 112, through the primary winding 120 of a pulse output transformer 122, and back into the timing capacitor 114. In this manner, the timing capacitor 114 is left fully discharged at the end of every power supply half cycle, and the functioning of the unijunction timing circuit is synchronized with the fluctuations of the power supply.

The trigger delay capacitor is the capacitor 138. This capacitor 138 is bypassed by a switch 140. When the switch 140 is closed, the flow of power to the load 18 terminates. When the switch 140 is opened, power is gradually applied to the load 18 under the control of the trigger delay capacitor 138.

The trigger delay capacitor 138 may either be connected across the source of charging for the timing capacitor 114 or it may be connected in series with a diode 136 between the nodes 107 and 108. The former connection is preferable in a multiphase system, while the latter connection is preferable in a single-phase system. However, either connection can be used in both single and multiphase systems.

In the preferred single-phase embodiment, the resistor 128 may be omitted along with the elements 130, 132, and 134. The trigger delay capacitor 138 is connected in series with the diode 136 directly between the nodes 107 and 108. When the switch 140 is closed, the positive node 108 is shorted to the negative node 107 by the diode 136, and no power reaches the unijunction transistor oscillator timing circuit. No current pulses are generated in the primary winding 120 of the transformer 122, and therefore no trigger pulses reach the controlled rectifiers 20 and 22. The phase control panel is thus off. When the switch 140 is opened, the capacitor 138 begins to charge by drawing current through the diode 136 from the node 108. The resistor 106 limits the magnitude of this charging current and determines how long it takes the capacitor 138 to charge. So long as the potential across the capacitor 138 is less than the Zener potential of the Zener diode 105, the capacitor 138 determines the potential between the nodes 108 and 107. After the switch 140 is opened, therefore, the potential of the node 108 rises gradually positive with respect to the node 107 until the Zener diode 105 clamps this voltage at its proper magnitude.

As noted above, when the switch 140 is closed, the unijunction transistor timing circuit generates no pulses. As the potential of the node 108 swings positive, the timing circuit is first supplied with a potential well below its normal operating potential. At first the timing capacitor 114 is not charged sufficiently to generate any pulses before being discharged by the input potential reversal at the end of each half cycle. As the potential of the node 108 goes more positive, the timing circuit begins to apply pulses to the secondary winding 120, but only towards the trailing edge of each half cycle. As the potential of the node 108 rises, these pulses move towards the middle of the half cycles. Finally, when the potential of the node 108 is stabilized by the Zener diode 105, the pulses reach their proper position in time as determined by the selling of the potentiometer 124. In this manner, a series of pulses is generated which gradually apply power to the load 18 after the switch 140 is opened. Starting transients are thus avoided entirely.

In the preferred multiphase embodiment, the capacitor 138 for each phase is connected through the diode 136 and the resistor 128 to a terminal G. The terminals G corresponding to each phase are then connected to a common control as is shown in FIGS. 2 and 3. The purpose of this common control is to allow the current which flows through the multiple phases to be adjusted simultaneously. Two possible controls are shown at the top of FIG. 1. The first is a potentiometer 146 which is connected between a positive potential node 152 and the negative potential node 107. The tap 154 of this potentiometer is connected to the terminals G. Adjustment of the potentiometer 146 then simultaneously changes the flow of power in all phases. The second is a transistor 150. The emitter of the transistor 150 is connected to a positive node 156 by a resistor 158 and the collector is connected to the terminals G. A DC control input signal is applied to the emitter 148 of the transistor 150. Variation of the DC control input signal simultaneously varies the power flow in all phases. Other equivalent controls can be used in place of the two suggested above. In multiphase operation, the diode 136 and the resistor 128 may be omitted from the circuit, if desired.

The multiphase embodiment functions differently than does the single-phase embodiment, but the end result is the same. When the switch 140 is closed, current flow through the resistors 130 and 132 is halted. The potentiometer 124 is adjusted so that the capacitor 114 is not quite charged sufficiently during a single half cycle to cause triggering. The capacitor 114 is discharged between half cycles, and hence no trigger pulses are generated. A diode 134 in series with resistors 130 and 132 prevents the capacitor 114 from discharging through these resistors.

When the switch 140 is opened, the capacitor 138 begins to charge. This charging current flows from the control, through the resistor 128 and the diode 136, and into the capacitor 138. As the potential across the capacitor 138 rises, current begins to flow through resistors 130 and 132 into the timing capacitor 114. This extra current speeds the rate at which the capacitor 114 charges sufficiently so that the timing circuit begins to generate trigger pulses at the very end of each half cycle. As the potential across the capacitor 138 increases, the current flow through resistors 130 and 132 increases, and the speed with which the timing capacitor 114 charges to the triggering level also increases. Hence, the trigger pulses shift toward the center of the half cycles. When the capacitor 138 stops charging, the trigger pulses have reached their normal position as determined by the signal applied to the terminal G.

In multiphase operations, it is important to balance the control panels so that they all supply the same amount of power. The potentiometers 160 are adjusted so that all unijunction transistors trigger at the same triggering potential, and the resistors 130 are adjusted to equalize the power supplied to each leg of the system. The switches 140 are ganged together and are simultaneously thrown whenever power is to be supplied to or removed from the load.

The circuit shown in FIG. 1 is the preferred embodiment of the present invention. When the terminal G is connected to the positive node 108 (as shown by the broken line) and when the resistor 128 is given a low ohmic value or is eliminated entirely, the preferred single-phase embodiment results. As mentioned above, the elements 130, 132, and 134 could be deleted.

Alternatively, the resistor 128 may be given a high ohmic value, in which case a single-phase system results that operates in a manner identical to the manner in which the preferred multiphase system operates. In this case, the elements 130, 132, and 134 are retained, but the diode 136 is not essential. This same identical circuit can also be used in multiphase systems by connecting the terminal G to an external control, as was noted above.

The trigger subsection 200 of the panel 10 includes two trigger pulse amplifiers 202 and 204. The amplifiers 202 and 204 are respectively triggered by secondary windings 142 and 144 of the pulse transformer 122. The respective output of the pulse amplifiers 202 and 204 are coupled by resistor-capacitor peaking circuits 206 and 208 and bridge rectifiers 210 and 212 to the trigger terminals 24 and 26 and cathodes 29 and 32 of the controlled rectifiers 20 and 22.

The pulse amplifiers 202 and 204 are powered by a transformer 214 having a primary winding 216 connected across the 110-volt terminals X and Y of the transformer 101. This primary winding 216 can be connected to any other convenient source of alternating current so long as it is synchronized with the 480-volt power supply connected across the terminals W and Z. A secondary winding 218 of the transformer 214 supplies power to the pulse amplifier 202, and a secondary winding 220 of the transformer 214 supplies power to the pulse amplifier 204.

The pulse amplifier 202 comprises a secondary winding 218, a controlled rectifier 222, and a Zener diode 226. These three components are connected in form of a loop, as shown in FIG. 1 The output of this circuit is taken across the Zener diode 226. The dot adjacent the winding 218 indicates that this winding is wound in such a manner that it supplies a positive voltage to the anode of the controlled rectifier 222 when the terminal Y of the primary winding 216 is supplied with a positive input potential. Since the controlled rectifier 222 cannot conduct unless its anode 234 is positive, the pulse amplifier 202 is disabled except during those half cycles when the terminal Y is positive. An examination of the dots adjacent the transformer 101 indicates that the terminal Y is driven positive when the terminal Z is driven positive by the incoming signal, and hence at a time when the controlled rectifier 20 is biased properly for triggering. Therefore the output of the pulse amplifier 202 is connected to the trigger terminal 24 of the controlled rectifier 20. The orientation of the pulse amplifier 204 is such that it is enabled only when the controlled rectifier 22 is biased properly for triggering. The output of the pulse amplifier 204 is therefore connected to the trigger terminal 26 of the controlled rectifier 22.

When the secondary winding 218 supplies a positive potential to the anode 234 of the controlled rectifier 222, the pulse amplifier 202 is enabled but does not supply an amplified output pulse until the silicon controlled rectifier 222 is rendered conductive by a trigger pulse supplied by the pulse transformer 122. A secondary winding 142 of the transformer 122 is connected between the cathode 234 and the trigger terminal 230 of the silicon controlled rectifier 222 and thus is arranged to trigger the silicon controlled rectifier 222 when a trigger pulse is generated by the timing circuit within the control subsection 100. When such a trigger pulse is generated, the silicon controlled rectifier 222 becomes fully conductive and connects the secondary winding 218 directly across the Zener diode 226. The purpose of the Zener diode 226 is to minimize noise transients which occasionally flow from the secondary winding 218. A resistor 227 in series with the Zener diode 226 limits the current which flows through the Zener diode 226 and thus protects it from overheating. The voltage thus developed across the Zener diode 226 and the resistor 227 is fed through the peaking circuit 206 to the input terminals of the bridge rectifier 210. The output terminals of the bridge rectifier 210 are connected between the cathode and trigger terminals 29 and 24 of the silicon controlled rectifier 20. The bridge rectifier 210 passes the amplified pulse directly to the cathode 26 and trigger terminal 24 of the controlled rectifier 20. The purpose of the bridge rectifier 210 is to prevent signal from flowing backwards through the transformer 122 and prematurely triggering the unijunction transistor 112. The diode bridge 210 thus acts as a one way valve, allowing amplified trigger pulses to reach the silicon controlled rectifier 20, but not permitting signals to flow in the opposite direction.

When the controlled rectifier 20 is first triggered, sufficient triggering current must be supplied to produce full conduction within the controlled rectifier 20 in the minimum possible time. If the triggering current is too small, conduction through the rectifier 20 will initially be limited to a small location adjacent the trigger terminal. A heavy load current flowing through this small location can easily overheat and destroy a controlled rectifier. The triggering current must be quickly reduced, however, to a low value so that the trigger terminal 24 itself is not destroyed. The peaking circuit 206 provides a heavy initial triggering current and then quickly reduces the trigger current amplitude to a safe value. The peaking circuit 206 comprises the parallel combination of a capacitor 240 with a resistor 242. When the silicon controlled rectifier 222 first becomes conductive, the capacitor 240 momentarily has the appearance of a short circuit and thus applies the full output potential of the pulse amplifier 202 to the trigger terminal 24 of the controlled rectifier 20. This high voltage produces a heavy triggering current which quickly places the controlled rectifier 20 into full conduction. After a time interval defined by the time constant of the peaking circuit 206, the capacitor 240 takes on the appearance of an open circuit. The resistor 242 then limits the triggering current to a safe value.

The above description of the circuitry which triggers the silicon controlled rectifier 20 is equally applicable to the circuitry which triggers the silicon controlled rectifier 22.

The triggering subsection 200 includes two additional protective circuits. The first comprises a triac 250 that is connected between the trigger terminals 24 and 26 of the controlled rectifiers 20 and 22, and diodes 252 and 254 connected between the trigger terminals 24 and 26 and the cathodes 29 and 32 of the controlled rectifiers 20 and 22. The diodes 252 and 254 are oriented to conduct when the trigger terminals 24 and 26 are negative with respect to the cathode terminals 29 and 32. This triac protects the controlled rectifiers 20 and 22 from high amplitude voltage transients. Voltage transients could otherwise cause failure of the controlled rectifiers. Since it is better to momentarily supply additional power to the load 18 than have the silicon controlled rectifiers 20 and 22 destroyed, the triac 250 is arranged to trigger one of the controlled rectifiers 20 or 22 whenever the voltage across the controlled rectifiers rises above a predetermined safe value as determined by the breakdown voltage of the triac 250. The triac 250 is thus used as a four layer breakdown diode.

The second additional protective circuit is a voltage transient suppressor. This circuit includes the series combination of a capacitor 256 with a resistor 258 and is connected in parallel with the controlled rectifiers 20 and 22. The capacitor 256 captures and stores momentary voltage surges and dissipates these surges in the resistor 258. The capacitor 256 keeps extremely sudden transients from triggering the triac 250 and sending excessive currents into the load 18.

In FIG. 1, a single source of single-phase power is used both to operate the subsections 55 and 200 of the phase control panel 10 and to power the load 18. This arrangement is not mandatory, and if it is more convenient separate power sources can be used for the load 18 and for the subsections 100 and 200. Power for the load 18 is applied to the terminals W and Z through appropriate fast blow fuses. The controlled rectifiers are then connected to the terminals C, D, E, and F of the control panel 10 in the manner shown in FIG. 1. Power for the subsection 100 is supplied to the terminals A and B, with the transformer 101 being replaced by a transformer that is appropriate to the power source being utilized. Power for the subsection 200 is supplied to the primary winding 216 of the transformer 214. Any suitable sources of alternating current power can be used so long as they are reasonably in phase with one another.

FIGS. 2 and 3 show respectively how the control panel 10 is used to supply power to Y and delta connected three phase load configurations. In FIG. 2 each of the three windings 501, 502, and 503 of the load is connected in series with its own pair of controlled rectifiers 504, 505, and 506. Trigger controls 507, 508, and 509 identical to the control panel 10 shown in FIG. 1 are connected to the pairs of rectifiers 504, 505, and 506 in the manner indicated. The connections to the terminals C, D, E, and F of each trigger control are identical to the corresponding connections made to the control panel in FIG. 10. The terminal A is connected to the power line side of the arrays, and the terminal B is connected to the neutral or common node 510. The control terminals G of the trigger controls 507, 508, and 509 are connected parallely to an external control 511 as was mentioned above. While it is not shown in FIG. 2 or 3, the negative terminals of each trigger control (corresponding to the node 107 in FIG. 1) are also connected parallely to the control 511. For clarity, this connection has been omitted from FIGS. 2 and 3. FIG. 3 shows a configuration which is used for delta connected loads. Each element of the load 601, 602, and 603 is connected in series with its own pair of silicon controlled rectifiers 604, 605, and 606. The resulting series circuits are then connected in triangular fashion across the three incoming power lines. Trigger controls 607, 608, and 609 are connected to each pair of controlled rectifiers 604, 605, and 606 in the manner shown in FIG. 1. The C inputs to each trigger control 607, 608, and 609 are strapped to the adjoining A inputs, and the B inputs are connected to the opposite ends of the adjacent loads 601, 602, and 603. The junctions of the rectifiers with the adjacent loads are connected to the F terminal of the adjacent trigger control. As in FIG. 2, the G terminals are connected in parallel to a control network 611.

In both FIGS. 2 and 3, fast blow fuses 512, 514, 516, 612, 614, and 616 are placed between the control circuitry and the incoming power lines. In case of an overload, these fuses are designed to blow out before the silicon controlled rectifiers are overheated to the destruction point.

In using control panels of this type to control the speed of motors, it must be kept in mind that ordinary motors are easily overheated when moving at slow speed. Many motors depend upon fans for cooling, and generally these fans are powered by the motors themselves. While theoretically the control circuits presented here can operate a motor at any speed and at any desired power transmission level, in practice care must be taken to see that the motor is not operated at a speed at which it is likely to overheat and burn out. With conventional single-phase motors of up to 100 HP, the range of control should be limited to about 30 percent (from 70 percent to 100 percent of full power). Multiphase motors are not so sensitive to overheating, and conventional multiphase motors can be operated over a power range of 50 percent (from 50 percent to 100 percent of full power) without serious overheating. With motors especially designed for cool operation under phase shift control, the control range of the circuit can be extended to whatever limits are set by the motor manufacturer.

Although the present invention has been described with reference to an illustrative embodiment thereof, it should be understood that numerous other modifications and changes will readily occur to those skilled in the art, and it is therefore intended by the appended claims to cover all such modifications and changes as fall within the true spirit and scope of the invention.

What is claimed as new and desired to be secured by Letters Patent of the United States is:

1. A phase control panel for controlling the flow of energy from an alternating current source of potential to a load comprising:
   fast blow fuse means;
   at least one controlled conduction device having a trigger terminal;
   a first series circuit connected across the alternating current source of potential and including the load, said fast blow fuse means, and said controlled conduction device;
   a relaxation oscillator having power input terminals and having a pulse output connected to the trigger terminal of the controlled conduction device;
   resistive means;
   a rectifier;
   a second series circuit comprising the rectifier, the resistive means, and the power input terminals of said relaxation oscillator connected across said alternating current source of potential;
   a third series circuit comprising a capacitor and a diode connected across the power input terminals of said relaxation oscillator; and
   switching means connected across said capacitor for alternately short circuiting the capacitor and allowing the capacitor to charge.

2. A phase control panel in accordance with claim 1 wherein the controlled conduction devices comprise a pair of back-to-back parallely connected high power silicon controlled rectifiers.

3. A phase control panel for controlling the flow of energy from an alternating current source of potential to a load comprising:
   fast blow fuse means;
   a pair of back-to-back parallely connected high power silicon controlled rectifiers having trigger terminals or a triac having a trigger terminal;
   a first series circuit connected across the alternating current source of potential and including the load, said fast blow fuse means, and said controlled conduction device;
   a relaxation oscillator having power input terminals and having a pulse output connected to the trigger terminal or terminals of the controlled rectifiers or of the triac;
   a rectifier connecting said alternating current source of potential to the power input terminals of said relaxation oscillator;
   a second series circuit comprising a capacitor and a diode connected across the power input terminal of said relaxation oscillator;
   switching means connected across said capacitor for alternately short circuiting the capacitor and allowing the capacitor to charge;
   a pulse amplifier circuit connecting the pulse output of the relaxation oscillator to the trigger terminal of each silicon controlled rectifier or to the trigger terminal of the triac comprising a source of alternating current potential, a low power silicon controlled rectifier having its trigger terminal connected to the pulse output of the relaxation oscillator, and an RC peaking circuit all connected in series between the cathode and the trigger terminal of each high power silicon controlled rectifier or of the triac.

4. A phase control panel in accordance with claim 3 wherein the relaxation oscillator comprises a unijunction transistor pulse generator.

5. A plurality of phase control panels each designed in accordance with claim 3 and each used to couple one leg of a multiphase load to one branch of a multiphase power source, and further including means for simultaneously actuating the switching means in all the phase controls simultaneously.

6. A phase control panel for controlling the flow of energy from an alternating current source of potential to a load comprising:
   fast blow fuse means;
   a pair of back-to-back parallelly connected high power silicon controlled rectifiers having trigger terminals or a triac having a trigger terminal;
   a first series circuit connected across the alternating current source of potential and including the load, said fast blow fuse means, and the pair of controlled rectifiers or the triac;
   a relaxation oscillator having a charging current input terminal, having a pulse output connected to the trigger terminals of the controlled conduction devices or to the trigger terminal of the triac, and having a pair of power input terminals;
   oscillator initialization means connected between the alternating current source of potential and the relaxation oscillator for resetting said relaxation oscillator at the start of each half cycle supplied by the current source;

a resistor connecting said charging current input terminal to one of said relaxation oscillator power input terminals;

a capacitor connecting said charging current input terminal to the other of said relaxation oscillator power input terminals;

switching means connected across said capacitor for alternately short circuiting the capacitor and allowing the capacitor to charge;

a pulse amplifier circuit connecting the output of the relaxation oscillator to the trigger terminal of each silicon controlled rectifier or to the trigger terminal of the triac comprising a source of alternating current potential, a low power silicon controlled rectifier having its trigger terminal connected to the pulse output of the relaxation oscillator, and an RC peaking circuit all connected in series between the cathode and the trigger terminal of each high power silicon controlled rectifier or of the triac.

7. A phase control panel in accordance with claim 6 wherein the relaxation oscillator comprises a unijunction transistor pulse generator.

8. A plurality of phase control panels each designed in accordance with claim 6 and each used to couple one leg of a multiphase load to one branch of a multiphase power source, and further including means for simultaneously actuating the switching means in all the phase control panels simultaneously.

9. A phase control panel for controlling the flow of energy from an alternating current source of potential to a load comprising:

fast blow fuse means;

a pair of back-to-back parallelly connected controlled conduction devices having trigger terminals interconnected by a voltage breakdown device;

a series circuit connected across the alternating current source of potential and including the load, said fast blow fuse means, and said pair of controlled conduction devices;

relaxation oscillator means having a pulse output;

a pair of pulse amplification means receiving pulses from the pulse output of said relaxation oscillator and feeding amplified pulses to said controlled conduction devices through RC peaking circuits;

oscillator initialization means connected between the alternating current source of potential and the relaxation oscillator for resetting said relaxation oscillator at the start of each half cycle supplied by the current source;

a capacitor within said relaxation oscillator means for delaying the generation of pulses by said relaxation oscillator means in inverse proportion to the charge on the capacitor; and switching means connected across said capacitor for alternately short circuiting said capacitor and allowing said capacitor to charge.

* * * * *